Patented Mar. 24, 1942

2,277,351

UNITED STATES PATENT OFFICE 2,277,351

PROCESS FOR STABILIZING ROSIN AND PINE OLEORESIN

William D. Pohle and Wiley C. Smith, Arlington, Va., assignors to Claude R. Wickard, as Secretary of Agriculture of the United States of America, and to his successors in office No Drawing. Application July 2, 1941, Serial No. 400,882

5 Claims. (Cl. 260—97)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government of the United States of America for governmental purposes without the payment to us of any royalty thereon.

This invention relates to the treatment of pine oleoresins and rosin, whereby stabilized products having high acid number are obtained.

An object of our invention is the conversion of oleoresin, and rosin, by heat, without a catalyst, to a stable product containing stable rosin acids, with a minimum reduction in the rosin acid content.

Another object of our invention is the conversion of the volatile fraction of oleoresin to products more stable toward oxygen and air.

Still another object of our invention is to effect a saving in the time of processing.

Rosins are graded and sold on a color basis. The lighter or less colored rosins are considered of the higher grades, and have a greater sale value. When used industrially, practically all rosin is subjected to some chemical or physical treatment; it is saponified to produce soaps and sizes, and combined with glycerine and other substances to form varnish resins. The value of a rosin, therefore, might well be judged by its effect on the quality of a product in which it is used.

Normal rosin contains unstable compounds, which take up oxygen from the air and form color bodies. This fact restricts the use of rosin in certain fields. For example, rosin cannot be used in appreciable quantities in white soap, as it contributes some yellow or brown color to it.

A rosin which is stable as regards both oxygen absorption and the color it contributes to products in which it is used can be prepared by the catalytic hydrogenation of rosin (U. S. Patents 1,167,264, 1,249,050, 1,899,961, 2,094,117). Stabilized rosins have been prepared by the heat isomerization of rosin in the presence of a catalyst (U. S. Patent 2,138,183). Certain stable rosin acids have been extracted from rosin oil (U. S. Patent 2,072,629; Chem. Zeit. 41, 666, 1917, and Bull. Inst. du Pin No. 51, page 181, 1928).

Our invention differs from the above-cited art in that we do not employ a catalyst, and our invention does not result in the formation of rosin oil.

Our invention consists essentially in heating the oleoresin, or rosin, in a bomb or pressure apparatus at temperatures ranging between 300° C. to 400° C., and at a pressure of at least 300 lbs. per square inch. We have found that the products obtained by our process differ markedly from those obtained by heating rosin, and oleoresin, at these temperatures at atmospheric pressure, as is common practice in the production of rosin oil. We have found that operating at pressures above 2,000 lbs. per square inch does not further improve the conversion. One advantage of our process is that the required pressure may be obtained from the vapors of the volatile compounds and the gases formed during the reaction. Another advantage of our process is that no catalyst is employed. As the temperature of treatment is increased, the rate of stabilization of the rosin acids and the rate of decarboxylation increases. Therefore, the exact temperature and time of treatment will depend upon the yield of rosin acids and the degree of stabilization of the rosin acids desired.

A preferred method of our invention may be carried out as follows: Rosin is charged into a pressure apparatus, and heated rapidly to 360° C. This temperature may be maintained for 30 to 40 minutes, or until substantially a maximum stabilization with a minimum decarboxylation is obtained. Products produced in this manner are stable toward oxygen, and have an acid number of 110–120, whereas, rosin heated at this temperature under atmospheric pressure is unstable to oxydation, and is low in acid number.

To produce a rosin of higher acid number, it may be subjected to vacuum distillation, whereby the acid number will range from 160–175.

Oleoresin may be treated in the same manner as our preferred treatment for rosin. After oleoresin has been so treated, the volatile or spirit fraction may be removed by steam distillation, or by vacuum distillation. The volatile or spirit fraction obtained from treated pine oleoresins is lower in specific gravity, less volatile, and oxidizes less readily when exposed to air than the spirit fraction (turpentine) of pine oleoresin. The less volatile material (rosin), having an acid number of 110–120, may be fractionated by vacuum distillation the same as described above, and will possess the same properties.

Having thus described our invention, what we claim for Letters Patent is:

1. A process for producing stabilized rosin, consisting of heating one of the group consisting of rosin and pine oleoresin at temperatures ranging between 300° C.–400° C. under at least 300-lb. pressure per square inch until substantially all the rosin has been converted into a stable form, thence distilling off the volatile fraction present, and thence recovering the residue as a stabilized rosin.

2. A process for producing stabilized rosin, consisting of heating pine oleoresin at temperatures ranging between 300° C.–400° C. under at least 300-lb. pressure per square inch until substantially all the rosin acids are in a stable form, thence distilling off the volatile fraction present and thence recovering the residue as a stabilized rosin.

3. A process for producing stable rosin acids, consisting of heating rosin at temperatures ranging between 300° C.–400° C. under at least 300-lb. pressure per square inch until all the rosin is in a stable form, thence subjecting the rosin to vacuum distillation, thereby obtaining a rosin with a high acid number.

4. A process for producing stable rosin acids, consisting of heating rosin at temperatures ranging between 300° C.–400° C. under at least 300-lb. pressure per square inch until all the rosin is in a stable form, thence subjecting the rosin to vacuum distillation, thereby obtaining a rosin with an acid number ranging from 160–175.

5. A process for producing stable rosin acids, consisting of heating pine oleoresin at temperatures ranging between 300° C.–400° C. under at least 300-lb. pressure per square inch until substantially all the rosin acids are in a stable form, thence distilling off the volatile fraction present, and thence subjecting the rosin to vacuum distillation, thereby obtaining a rosin with an acid number ranging from 160–175.

WILLIAM D. POHLE.
WILEY C. SMITH.